Jan. 17, 1967   A. C. H. BORSBOOM ET AL   3,299,258
CORRECTION DEVICE FOR ELECTRONIC FLOW RATIO CONTROLLER
Filed June 26, 1963   2 Sheets-Sheet 1

INVENTORS:
A. C. H. BORSBOOM
H. J. NIHOF
BY: Theodore E. Bieber
THEIR ATTORNEY

INVENTORS:
A.C.H. BORSBOOM
H.J. NIHOF

THEIR ATTORNEY

United States Patent Office 3,299,258
Patented Jan. 17, 1967

3,299,258
CORRECTION DEVICE FOR ELECTRONIC FLOW RATIO CONTROLLER
Albertus C. H. Borsboom and Hendrikus J. Nihof, Amsterdam, Netherlands, assignors to Shell Oil Company, New York, N.Y., a corporation of Delaware
Filed June 26, 1963, Ser. No. 290,709
Claims priority, application Netherlands, Aug. 3, 1962, 281,721
4 Claims. (Cl. 235—151.34)

This invention relates to a device for automatically controlling the ratio of the quantities of streams of media, for instance, fluids supplied through two lines.

A device for effecting this type of control is described in Patent No. 3,089,643 entitled Control System. According to this patent, a volumetric flow meter is disposed in each stream to supply output signals having frequencies $f_a$ and $f_b$ proportional to the rate of flow in the lines. The meter output signals control two switching relays that periodically charge the respective auxiliary capacitors by means of two direct current voltages. The ratio of the two voltages can be adjusted by means of a potentiometer, and the auxiliary capacities discharged into a reservoir capacitor. The voltage across the reservoir capacitor or a magnitude derived therefrom is used for controlling the rate of flow in at least one of the lines.

Systems described in the above referenced patent are applied, for instance, in oil refineries, where it is often necessary to mix large quantities of liquids in a given, predetermined ratio, for instance, when blending gasolines. The blending or mixing can be accomplished directly in a system of pipes, after which the resultant mixture can be supplied directly or further processed without intermediate storage in a mixing tank.

The automatic control as described above is based on the measurement of streams by volume, so that the mixture obtained has a constant ratio by volume of the components. In practice, however, it is often necessary to correct this ratio by volume in order to meet special requirements of the final product. For this purpose the influence of one or more properties other than the rate of flow of the media will have to be taken into account when adjusting the ratio by volume. It may, for instance, be desired that the viscosity or vapor tension or the electric conductivity shall have a given value. It may also be desired, for instance, that the content of a component has a given value. Furthermore, it may be desired, for instance, that the mixture has a constant mass relation of the component liquids.

Accordingly, it is the principal object of this invention to provide a system for correcting a control signal for changes in the characteristic of one phenomena where the control signal represents a predetermined relationship between the one phenomena and a second phenomena.

A further object of this invention is to provide a system for correcting at least one of two signals that represent the rate of flow of two mediums for changes in the physical characteristics of one of the mediums wherein the two signals are combined to provide a control signal representing the ratio of the two mediums.

The above objects and advantages of this invention are achieved by utilizing the control system described and claimed in the above-referenced patent. This system utilizes flow meters for developing two alternating signals that are related to the rate of flow of media in two streams. The two alternating signals are then used to operate a polarized switching delay that is disposed in the system to alternately charge from a fixed voltage source and then discharge two auxiliary capacitors in opposition to each other through a reservoir capacitor. The voltage appearing across the reservoir capacitor is then used as the control signal that represents the ratio of the medium flowing in the two streams.

The present invention utilizes a means, for example, by at least one additional auxiliary capacitor for adjusting the voltage on the reservoir capacitor. Each of the additional auxiliary capacitors is charged by means of an associated switching relay whose operation is controlled by one of the alternating current signals that represent the rate of flow of one of the medium. The additional auxiliary capacitors are charged from a separate direct current voltage source and periodically discharge into the reservoir capacitor. Thus, the voltage on the reservoir capacitor depends not only upon the charge suppled by the two auxiliary capacitors but also upon the charge from the additional auxiliary capacitors. The number of additional auxiliary capacitors utilized will depend of course upon the number of corrections that are desired. Normally, it is preferable to dispose the potentiometer that determines the relationship between the direct current voltages used for charging the two auxiliary capacitors in circuit with one auxiliary capacitor and use the frequency that controls the charging rate of the other auxiliary capacitor for controlling the charging of the additional auxiliary capacitors. In this way it is possible to have the correction current that flows periodically from the additional auxiliary capacitors to the reservoir capacitor independent of the ratio of the direct current voltages used for charging the two auxiliary capacitors. This is necessary since the ratio between the two voltages used for charging the auxiliary capacitors is related to the ratio of the rate of flow in the two lines whose flow rates are controlled. Thus, the ratio of the two flows can be modified without effecting the correction supplied by the additional auxiliary capacitors.

The above objects and advantages of this invention will be more easily understood from the following detailed description of preferred embodiments when taken in conjunction with the attached drawings in which.

Figure 1:
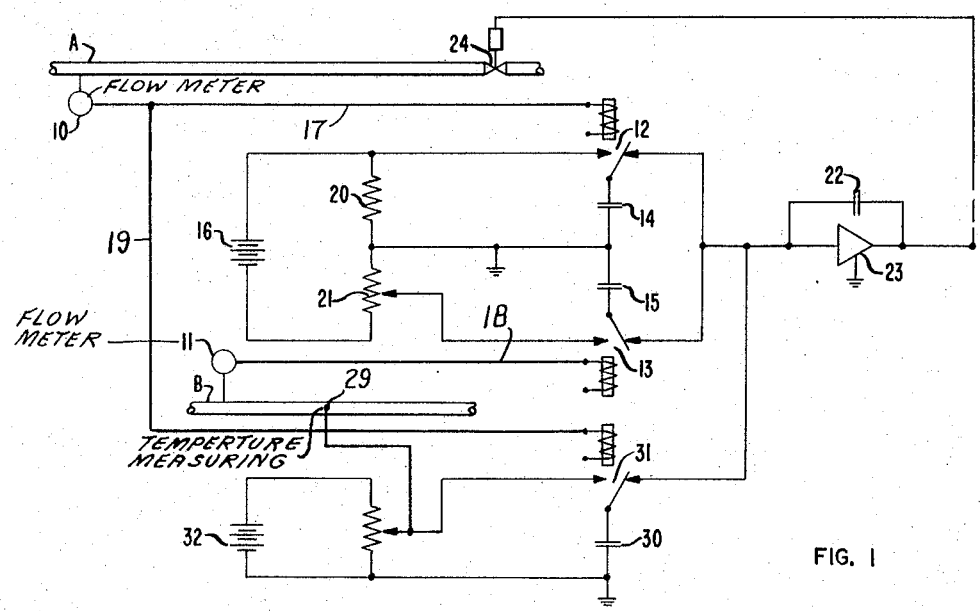
FIGURE 1 is a schematic drawing of one embodiment of this invention with the potentiometer disposed in series with the circuit of one of the auxiliary capacitors.

In FIGURE 1, A and B represent the two lines through which media are flowing at rates $F_A$ and $F_B$. These velocities are converted into electrical signals having frequencies $f_a$ and $f_b$ by means of flow meters 10 and 11. Conductors 17 and 18 couple the two switching relays, 12 and 13 to the flow meters 10 and 11 respectively to periodically connect the auxiliary capacitors 14 and 15 to the charging unit. The charging unit consists of a source of direct current voltage 16, a fixed resistance 20 and a potentiometer 21. The two auxiliary capacitors 14 and 15 discharge into a reservoir capacitor 22. A signal is derived from the reservoir capacitor 22 by means described in the above referenced patent and used for control purposes. For example, the voltage appearing across the reservoir capacitor 22 may be used directly or indirectly as shown in FIGURE 1. As shown in FIGURE 1 the voltage is maintained preferably near a zero value in order that the auxiliary capacitors 14 and 15 may be completely or at least substantially discharged into the reservoir capacitor. In order to accomplish this purpose it is preferable to use a current amplifier 23 which generates a signal substantially equal but of opposite polarity to the voltage appearing across the reservoir capacitor. This signal is then sent back to the discharge circuit of the auxiliary capacitors. Thus, in effect the voltage across the reservoir capacitor has substantially a zero value while at the same time the output of the amplifier 23 may be used to control the rate of flow in the line A as by means of a valve 24.

An extra auxiliary capacitor 30 is periodically connected by means of an extra switching relay 31 at the frequency $f_a$ with a source of direct current voltage 32 and with the reservoir capacitor 22. The relay 31 is connected to the flow meter 10 by a conductor 19. In this circuit the potentiometer 21 is disposed in the branch of the charging device that supplies voltage for the auxiliary capacitor 15.

Figure 2:
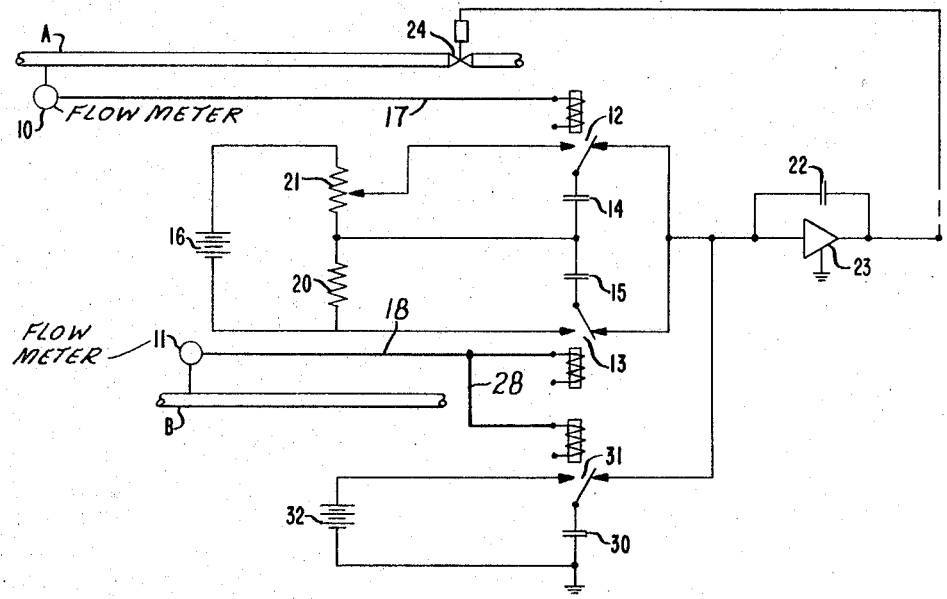
FIGURE 2 is an additional schematic drawing of another embodiment of this invention with the potentiometer disposed in the circuit of the other auxiliary capacitor.

The device shown in FIGURE 2 is similar to the device shown in FIGURE 1. The difference being that the position of the potentiometer 21 is shown in the branch that feeds the auxiliary capacitor 14. The extra switching relay 31 for the extra auxiliary capacitor 30 is coupled by conductor 28 to the flow meter 11 to be switched at the frequency $f_b$.

As shown in both FIGURES 1 and 2, the power supply 32 for the additional auxiliary capacitor 30 utilizes a potentiometer to vary the voltage supplied to charge the capacitor. Preferably, this voltage range is from zero to maximum value and is controlled by the characteristic of the medium flowing in one of the streams A or B. More particularly, it is controlled by the change in the characteristic of the medium for which it is desired to correct. For example, if it is desired to correct the control signal for variation in temperature of the medium flowing in the flow stream B a temperature sensitive element 29 should be disposed in the flow stream B and used to position the movable contact of the potentiometer in the power supply 32. Of course, other means than the battery and potentiometer shown for the power supply 32 may be used as a power supply for charging the additional auxiliary capacitor 30. The only requirement is that it be possible to vary this charging voltage from zero to some finite value to provide a correction from zero to any desired value.

Both of the systems shown in FIGURES 1 and 2 operate in substantially the same manner. As explained in the above-referenced patent, the two auxiliary capacitors 14 and 15 are charged from the power supply 16 and discharged into the reservoir capacitor 22. In addition, the auxiliary capacitor of this invention also discharges into the reservoir capacitor. The amount of charge supplied by the auxiliary capacitor will vary depending on the magnitude of the characteristic for which a correction is desired.

Figure 3:
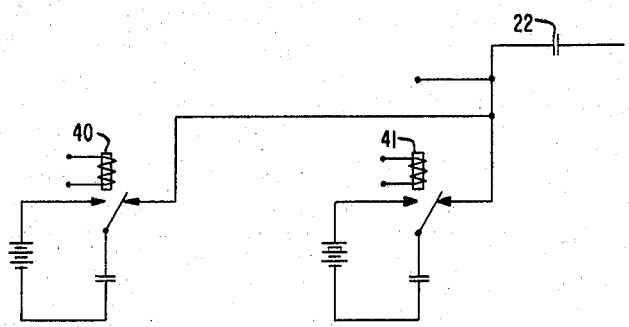
FIGURE 3 illustrates a portion of the circuit shown in FIGURE 1 wherein a plurality of auxiliary capacitors are used.

If several extra auxiliary capacitors are desired, several circuits with extra auxiliary capacitors as described above are connected in parallel as shown in FIGURE 3. The extra switching relays 40 and 41 all operate at either of the frequencies $f_a$ or $f_b$, depending on the location of the potentiometer 21.

Figure 4:
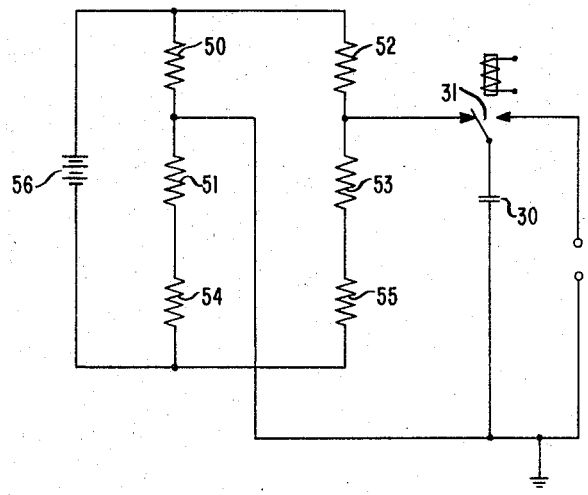
FIGURE 4 illustrates a circuit for obtaining the voltage for charging the auxiliary capacitor shown in FIGURES 1 and 2.

If two liquids are required to be mixed in a constant ratio by weight, a power supply as shown in FIGURE 4 may for instance be used to secure a correction current when one extra auxiliary capacitor is used. The power supply is a Wheatstone bridge, wherein each leg has two variable resistances 50, 51 and 52, 53 and a temperature-sensitive resistance 54 and 55 connected in series. The bridge is powered from a direct current source 56.

In FIGURE 4, 54 and 55 represent the temperature-sensitive resistances that are each disposed in one of the flowing media. By means of the variable resistances 51 and 53, allowance can be made for differences in coefficients of thermal expansion of the media in which 54 and 55 are placed. For the highest value of the coefficient of expansion 54 or 53 is chosen equal to zero.

Suitable values for the various voltages, resistances and capacitors, in so far as such are of importance in the device according to the invention, are:

Capacitors 14 and 15 _____ .03 mfd.
Capacitor 30 _____ 10 mfd.
Voltage 16 _____ 160 volts D.C.
Voltage 56 _____ 16 volts D.C.
$R_{50}=10(R_{T_O}+R_{51})$ _____ In which $R_{T_O}$ is the resistance of $R_{54}$ at the initial temperature $T_O$ chosen.
$R_{52}=10R_{T_O}+R_{53})$ _____
$R_{51}=R_{T_O}(2.10^{-3} \cdot \rho_{10}/\lambda_1-1)$ __ In which $\rho_{10}$ stands for the density of the medium 1 at temperature $T_O$ and $\lambda_1$ for the correction coefficient of medium A.
$R_{53}=R_{T_O}(2.10^{-3} \cdot \rho_{20}/\lambda_2-1)$ __ In which $\rho_{20}$ and $\lambda_2$ are correspondingly defined for medium B.

When a deviation from the desired value of the difference in temperature occurs a voltage will be set up across the bridge, in consequence of this an electric current is supplied to the reservoir capacitor 22 of FIGURES 1 and 2. The control unit that is controlled by the voltage across the reservoir capacitor will then modify the relationship of the rates of flow of the liquids until the voltage across the reservoir capacitor has become equal to zero. By choosing the appropriate polarity of the bridge feed the modification of the rates of flow of the liquids can be effected in such a manner that the velocity by volume of the liquid that has been heated—and hence become lighter—increases, in consequence of which the desired mass ratio is secured. By varying the resistances that are connected in series with the temperature-sensitive resistances, the right correction can be procured for any value of the coefficient of expansion of liquids.

Extension of the device for controlling the ratio of quantities of media flowing through more than two lines can be brought about by regulating the ratio of any two streams, for instance the combination A and B and A with C. It will always be possible to add a correcting device according to this invention to the apparatus for controlling any combination.

EXAMPLE

With a device consisting of the combination of the circuits shown in FIGURES 4 and 1 the following experiments were carried out.

Through line A was pumped an oil having a density of $\rho_{15}=0.9266$ and a correction coefficient $0.720 \cdot 10^{-3}$. Through line B was pumped an oil with a density of $\rho_{15}=0.8661$ and a correction coefficient $\lambda=0.855 \cdot 10^{-3}$. Both liquids were pumped through the lines at a velocity of about 100 litres per hour and each separately collected in weighing vessels. The following table gives the error in the ratio of the weights at varied temperatures of the two oils. The error is expressed as a percentage of the desired relationship.

| Experiment | Temperature (° C.) of— | | Error, percent |
|---|---|---|---|
| | Oil A | Oil B | |
| 1 | 30 | 30 | −0.05 |
| 2 | 70 | 30 | −0.22 |
| 3 | 105 | 30 | −0.47 |
| 4 | 50 | 50 | −0.04 |
| 5 | 82 | 55 | −0.28 |
| 6 | 25 | 65 | +0.12 |
| 7 | 85 | 80 | −0.09 |
| 8 | 65 | 85 | +0.10 |
| 9 | 30 | 100 | +0.38 |

Without correction for the temperature by means of the extra auxiliary capacitor 30 the error would rise to as much as 5%.

We claim as our invention:

1. A device for the automatic control of the relationship of the quantities of streams of media supplied through two lines comprising:

a flow meter disposed in each of the lines to supply two output signals having frequencies proportional to the rate of flow in the two lines;

two switching relays, one of said relays being coupled to the flow meter in one line, the other relay being coupled to the flow meter in the second line;

two auxiliary capacitors, one of said capacitors being coupled to a first source of direct current voltage and to a reservoir capacitor through the contacts of said one relay and the other of said capacitors being coupled to a second source of direct current voltage and said reservoir capacitor through the contacts of said other relay;

means coupled to said first and second sources of direct current voltage to carry the relationship between said sources;

at least one additional auxiliary capacitor;

an additional switching relay, said additional auxiliary capacitor being coupled to a third source of direct current voltage and said reservoir capacitor through the contacts of said additional switching relay, said additional switching relay being coupled to one of the flow meters; and monitoring means disposed to monitor a characteristic of the media in one stream, said means being coupled to said third direct current voltage source to control the magnitude thereof.

2. The device of claim 1 wherein the monitoring means measures the temperature of one of the media.

3. The device of claim 2 and in addition a Wheatstone bridge, each branch of said Wheatstone bridge having two variable resistances and a temperature-sensitive resistance in series, said bridge being fed by a direct current voltage; one of the temperature-sensitive resistances being disposed in each of the flowing media and the difference in voltage between the two branches of the bridge at the points in each branch where the two variable resistances are connected to each other being the third source of direct current voltage by which the extra auxiliary capacitor is periodically charged.

4. The device of claim 1 wherein the additional switching relay is coupled to the flow meters in said one line and a potentiometer is disposed in series with the contacts of the relay coupled to the flow meter in said second line whereby said potentiometer controls the relationship between the first and second sources of direct current.

No references cited.

MALCOLM A. MORRISON, *Primary Examiner.*

M. P. HARTMAN, *Assistant Examiner.*